US008145379B2

(12) United States Patent
Schwinke

(10) Patent No.: US 8,145,379 B2
(45) Date of Patent: Mar. 27, 2012

(54) SYSTEM AND METHOD FOR COMMUNICATING VEHICLE DIAGNOSTIC DATA

(75) Inventor: Steven P. Schwinke, Plymouth, MI (US)

(73) Assignee: General Motors LLC, Detroit, MI (US)

( * ) Notice: Subject to any disclaimer, the term of this patent is extended or adjusted under 35 U.S.C. 154(b) by 1023 days.

(21) Appl. No.: 12/058,863

(22) Filed: Mar. 31, 2008

(65) Prior Publication Data

US 2009/0248236 A1 Oct. 1, 2009

(51) Int. Cl.
*G01M 17/00* (2006.01)

(52) U.S. Cl. ........... 701/33; 701/29; 701/35; 455/404.1; 455/418; 455/419; 455/445

(58) Field of Classification Search .................... 701/29, 701/33, 35; 455/404.1, 418, 419, 445; 340/425.5, 340/438, 539.18
See application file for complete search history.

(56) References Cited

U.S. PATENT DOCUMENTS

| | | | | |
|---|---|---|---|---|
| 5,319,699 | A * | 6/1994 | Kerihuel et al. | 455/461 |
| 5,400,018 | A * | 3/1995 | Scholl et al. | 340/10.3 |
| 5,659,605 | A * | 8/1997 | Voit et al. | 379/243 |
| 5,887,253 | A * | 3/1999 | O'Neil et al. | 455/418 |
| 6,157,829 | A * | 12/2000 | Grube et al. | 455/414.1 |
| 6,181,994 | B1 * | 1/2001 | Colson et al. | 701/33 |
| 6,263,268 | B1 * | 7/2001 | Nathanson | 701/29 |
| 6,330,499 | B1 * | 12/2001 | Chou et al. | 701/33 |
| 6,915,126 | B2 * | 7/2005 | Mazzara, Jr. | 455/411 |
| 6,933,842 | B2 * | 8/2005 | Oesterling et al. | 340/539.24 |
| 7,082,359 | B2 * | 7/2006 | Breed | 701/36 |
| 7,110,512 | B2 * | 9/2006 | Maropis et al. | 379/114.2 |
| 7,245,912 | B1 * | 7/2007 | Fenton et al. | 455/433 |
| 7,873,345 | B1 * | 1/2011 | Dunne et al. | 455/404.1 |
| 2002/0065590 | A1 * | 5/2002 | Matsui | 701/33 |
| 2002/0173885 | A1 * | 11/2002 | Lowrey et al. | 701/29 |
| 2004/0101123 | A1 * | 5/2004 | Garcia | 379/220.01 |
| 2004/0235483 | A1 * | 11/2004 | Sylvain | 455/445 |
| 2005/0186941 | A1 * | 8/2005 | Gault et al. | 455/411 |
| 2006/0025966 | A1 * | 2/2006 | Kanamaru | 702/184 |
| 2006/0079203 | A1 * | 4/2006 | Nicolini | 455/411 |
| 2007/0050126 | A1 * | 3/2007 | Nou | 701/117 |
| 2007/0093947 | A1 * | 4/2007 | Gould et al. | 701/29 |
| 2007/0254639 | A1 * | 11/2007 | Chmielewski et al. | 455/419 |
| 2009/0036091 | A1 * | 2/2009 | Ball et al. | 455/404.1 |

* cited by examiner

*Primary Examiner* — Darnell Jayne
*Assistant Examiner* — Sasha T Varghese
(74) *Attorney, Agent, or Firm* — Anthony L. Simon; Reising Ethington P.C.

(57) ABSTRACT

A system and method for communicating vehicle diagnostic data via an inactive telematics unit. A serious diagnostic condition detected in the vehicle is used to trigger a call from the telematics unit to a call center using a cleared number. During the call, diagnostic data can be transmitted to the call center and a temporary number can be provided by the call center to the telematics unit to permit temporary communication. Additional diagnostics can be run and reported using this temporary number.

19 Claims, 2 Drawing Sheets

SYSTEM AND METHOD FOR COMMUNICATING VEHICLE DIAGNOSTIC DATA

TECHNICAL FIELD

The present invention generally relates to vehicle communication systems and, more particularly, to vehicle communications systems that communicate vehicle diagnostic data from a vehicle to a call center or other remote entity.

BACKGROUND

It is known for vehicles having active telematics units to communicate vehicle diagnostic data. However, instances can arise where it is desirable to communicate vehicle diagnostic data even though the vehicle's telematics unit is inactive. For example, a vehicle telematics unit may be inactive because an account subscriber has elected to stop paying for a telematics-based service. In such a case, the telematics unit may be lacking a mobile dialing number/mobile identification number (MDN/MIN) so that it cannot engage in conventional two-way telephony.

SUMMARY OF THE INVENTION

According to one aspect, there is provided a system for communicating vehicle diagnostic data. The system comprises a first vehicle component for detecting a vehicle diagnostic condition, and a second vehicle component for wirelessly communicating with a call center and being in communication with the first vehicle component. In response to the first vehicle component detecting the vehicle diagnostic condition: i) the second vehicle component makes a first wireless call to the call center; ii) the call center provides the second vehicle component with a temporary number while the first wireless call is still in progress; and iii) the call center removes the temporary number after the temporary number has expired.

According to another aspect, there is provided a method for communicating vehicle diagnostic data. The method comprises the steps of: (a) detecting a vehicle diagnostic condition; (b) evaluating the vehicle diagnostic condition to determine if it is a serious diagnostic condition; (c) if the vehicle diagnostic condition is determined to be a serious diagnostic condition, then retrieving a cleared number; and d) making a wireless vehicle-originated call from the vehicle to the call center, wherein the wireless vehicle-originated call includes information representative of the serious diagnostic condition.

According to another aspect, there is provided a method for communicating vehicle diagnostic data. The method comprises the steps of: (a) detecting a vehicle diagnostic condition with a vehicle system module (VSM) and sending a diagnostic trouble code (DTC); (b) receiving the diagnostic trouble code (DTC) at a telematics unit and comparing the DTC to a list of DTCs saved in memory in order to determine if the DTC is a serious DTC; (c) if the diagnostic trouble code (DTC) is a serious DTC, then retrieving a cleared number; (d) using the cleared number to make a wireless vehicle-originated call from the telematics unit to a call center; (e) activating the telematics unit with a temporary number that enables the telematics unit to receive wireless vehicle-terminated calls; and (f) deactivating the telematics unit after the temporary number expires.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The system and method described herein can be particularly useful in situations where a vehicle telematics unit is inactive, but a serious diagnostic condition is detected that warrants wireless communication with a call center or other entity. Normally, such wireless communication would not be possible because the inactive telematics unit is unable to make an outbound, vehicle-originated call. According to one embodiment, the exemplary system and method described herein addresses this situation by using a cleared number stored at the vehicle to make a wireless vehicle-originated call to the call center. Once connected, the call center can activate the telematics unit by providing it with a temporary number that enables it to receive wireless vehicle-terminated calls. Following expiration of the temporary number, the telematics unit is deactivated and the temporary number is returned to a pool of available numbers.

System—

Figure 1:
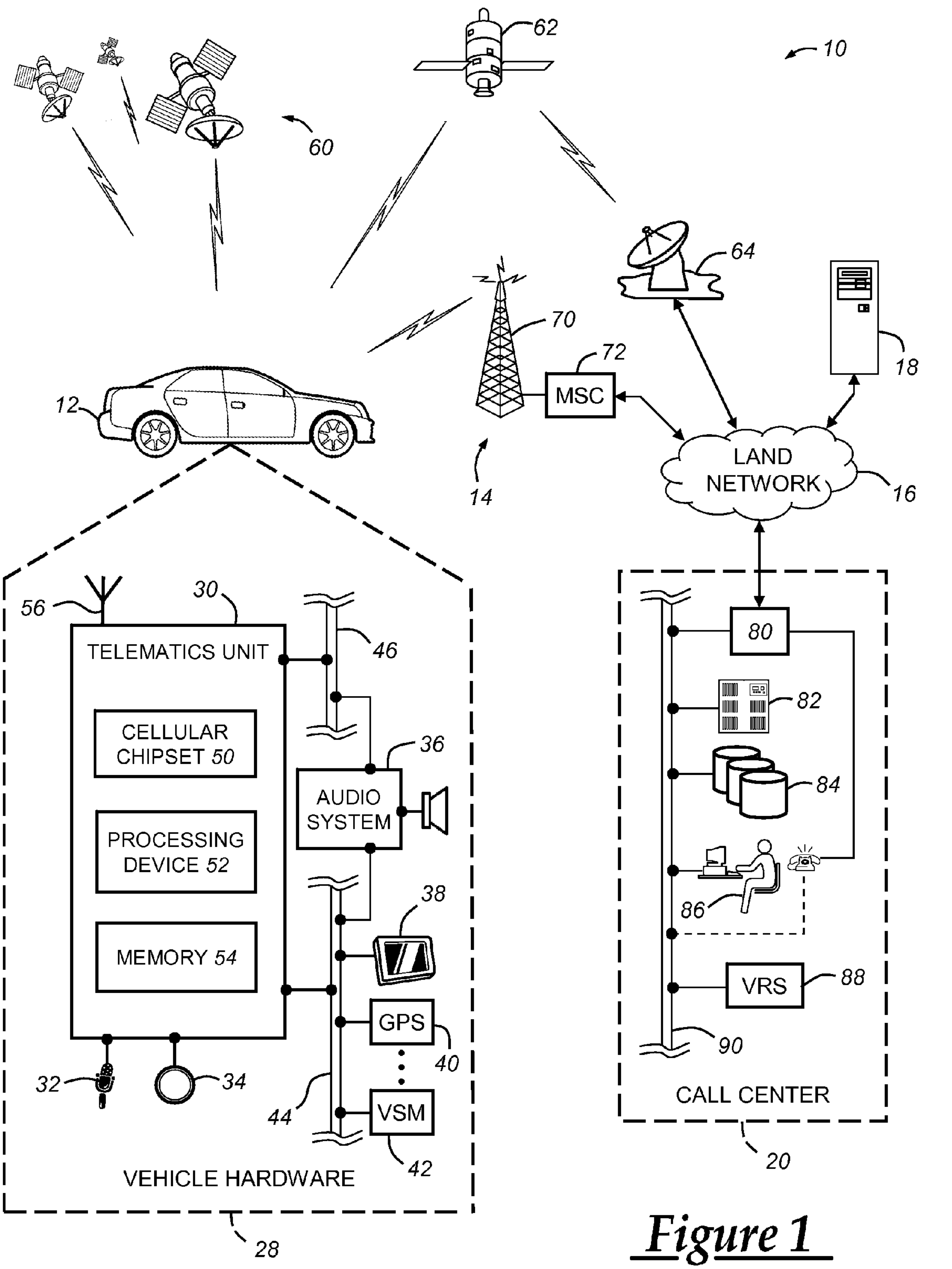
FIG. 1 is an exemplary embodiment of a mobile vehicle communications system.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. The following paragraphs simply provide a brief overview of an exemplary communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1 and include vehicle components such as telematics unit 30, a microphone 32, one or more pushbuttons or other control inputs 34, an audio system 36, a visual display 38, and a GPS module 40, as well as a number of vehicle system modules (VSMs) 42. Some of these vehicle components can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed vehicle component that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data communications, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switch data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle components and systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: diagnostic reporting using one or more diagnostic modules or VSMs 42; turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize communications bus 44 to exchange data and commands with the telematics unit.

GPS module 40 receives radio signals from a constellation 60 of GPS satellites. From these signals, the module 40 can determine a vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the vehicle components that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both communications bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
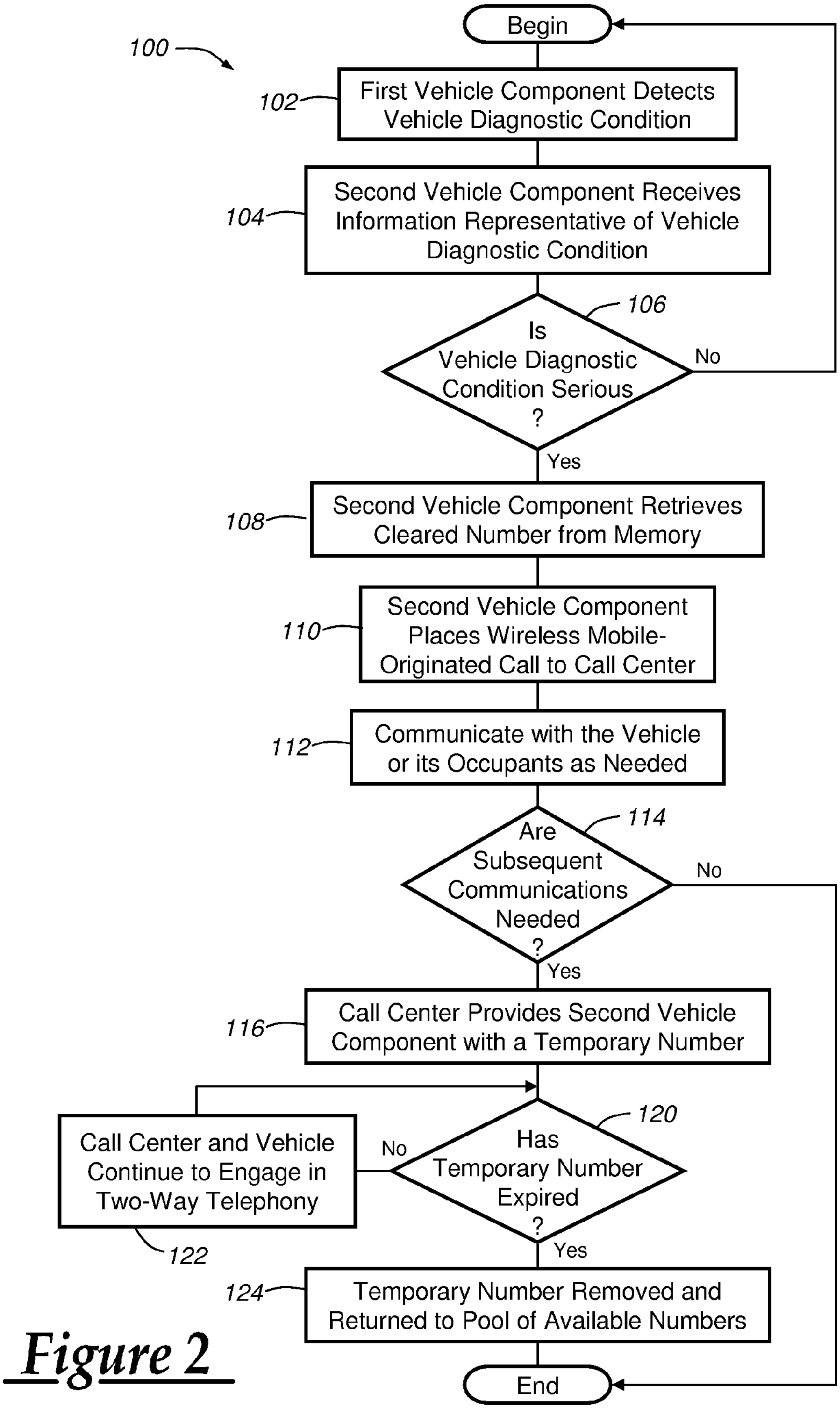
FIG. 2 is a flowchart showing some of the steps of an exemplary method for communicating vehicle diagnostic data.

Turning now to FIG. 2, there is shown an exemplary embodiment of a method 100 for communicating vehicle diagnostic data. This embodiment can be particularly useful in situations where a vehicle telematics unit is inactive—e.g., if a vehicle owner has elected to stop paying for their subscription to a telematics-based service—but a serious diagnostic condition is detected that warrants wireless communication with a call center or other entity. Normally, such wireless communication would not be possible because the inactive telematics unit is unable to make an outbound, vehicle-originated call. The exemplary method 100 can address, inter alia, this situation.

Beginning with step 102, a first vehicle component detects a vehicle diagnostic condition. The term "vehicle diagnostic condition" broadly refers to any diagnostic condition, parameter, reading, etc. that can be sensed by the vehicle; this includes diagnostic conditions pertaining to mechanical, electrical, software, and other types of vehicle operations. According to an exemplary embodiment, a vehicle system module (VSM) 42 utilizes one or more sensors to detect a vehicle diagnostic condition, and generates a diagnostic trouble code (DTC) that is representative of the sensed diagnostic condition. The DTC can be included within an electronic message, either by itself or combined with additional information, that is sent from VSM 42 over communications bus 44. Various methods and techniques are known in the art for detecting a vehicle diagnostic condition and generating a corresponding DTC, all of which may be used here.

In step 104, a second vehicle component receives information from the first vehicle component that is representative of the vehicle diagnostic condition detected in the previous step. For example, telematics unit 30 can passively listen in on communications bus 44 for electronic messages containing diagnostic trouble codes (DTCs) or other pieces of information pertaining to vehicle diagnostic conditions. Of course, components other than telematics unit 30 could be used to monitor and look for communications pertaining to vehicle diagnostic information. Alternatively, telematics unit 30 could be designed to periodically query vehicle components, such as VSMs 42, in order to acquire vehicle diagnostic conditions; i.e., active monitoring, instead of the passive monitoring or listening described above. In another embodiment, telematics unit 30 actually detects the vehicle diagnostic condition, as described in step 102, and thus acts as both the first and second vehicle components mentioned above.

Next, the second vehicle component evaluates the vehicle diagnostic condition to determine if it is a serious diagnostic condition, step 106. A "serious diagnostic condition" can include any diagnostic condition that is deemed significant or important enough to warrant placing a wireless call to call center 20 or some other entity. In the exemplary embodiment where telematics unit 30 receives a diagnostic trouble code (DTC), step 106 can utilize a look-up table or other data structure containing a list of DTCs to determine if the detected vehicle diagnostic condition is serious. This comparison can be performed wholly or partially within telematics unit 30 and with information stored in memory device 54, or it could be performed outside of the telematics unit. For instance, the vehicle system module (VSM) 42 that sent the DTC could evaluate the vehicle diagnostic condition to determine if it is serious before sending the DTC. In another potential embodiment, telematics unit 30 monitors communications bus 44 for DTC messages sent from specific vehicle system modules (VSMs) 42; that is, the telematics unit makes the determination of whether or not a vehicle diagnostic condition is serious based on the source of the message, not necessarily the contents of the message. If the vehicle diagnostic condition is not deemed to be serious, method 100 could simply continue with its monitoring at step 102. If, on the other hand, a serious vehicle diagnostic condition is detected, then the method proceeds to step 108.

In step 108, the second vehicle component retrieves a cleared number from memory. A "cleared number" broadly refers to any number or address that can be used by a telematics unit or the like to make a vehicle-originated wireless call, even though the telematics unit is currently inactive; i.e., the telematics unit does not currently have an active phone number. In some aspects, the cleared number operates in a similar manner to a toll-free number, like an "800" number, or a prepaid mobile phone. As skilled artisans will appreciate, an inactive telematics unit usually does not have a mobile dialing number (MDN) or a mobile identification number (MIN) paired to its electronic serial number (ESN). Thus, a wireless carrier is usually unable to process a vehicle-originated call from an inactive telematics unit, as it cannot verify that the device is authorized to use the system. The cleared number addresses this challenge.

The cleared number can either be permanently or non-permanently stored in memory located at the vehicle. In one embodiment, the cleared number is stored in memory 54 and is expected to expire after some event pertaining to time, vehicle mileage, or some other metric known and used by those skilled in the art. For instance, a cleared number could be stored in memory 54 for a certain amount of time following an event like the manufacture of the vehicle, the deactivation of the telematics unit, etc. (e.g., ten years from the date of vehicle manufacture or five years from the date of telematics unit deactivation). Instead, the cleared number could be stored in memory 54 on a vehicle mileage basis (e.g., a total of one-hundred thousand miles or twenty-five thousand miles from the point of telematics unit deactivation). Once a cleared number has expired, telematics unit 30 cannot rely upon it to make a wireless vehicle-originated call.

The second vehicle component, which in the example above is telematics unit 30, then uses the cleared number to place a wireless vehicle-originated call to call center 20 or some other entity, step 1110. In an exemplary embodiment, the vehicle-originated call is a vehicle data upload (VDU), which involves the transfer of one or more pieces of diagnostic information from vehicle 12 to call center 20. VDUs are typically performed over a wireless data connection; e.g., a data connection over a voice channel (i.e., a circuit switched connection) or a data connection over a data channel (i.e., a packet data connection). With the VDU, call center 20 can quickly be brought up to speed regarding the status of the serious diagnostic condition—which is the impetus for the VDU—without the user having to verbally walk live advisor 86 or some other person through a chronology of events and facts.

It is preferable that the wireless vehicle-originated call include at least the following pieces of information: i) some type of vehicle identifier (this can be a vehicle identification number (VIN), an electronic serial number (ESN), an account name/number, or any other piece of information that identifies the vehicle), and ii) information representative of the vehicle diagnostic condition previously detected. In one exemplary embodiment, telematics unit 30 initiates a VDU with call center 20 using a data connection over a voice channel (circuit switched connection), and the VDU includes the vehicle's VIN and the actual DTC that was detected in step 102; this upload could include additional information.

Depending on the contents of the wireless vehicle-originated call, a live advisor 86 or an automated response system could answer the incoming call and communicate with the vehicle or its occupants, step 112. For example, if a VDU was performed that includes a diagnostic trouble code (DTC) that suggests the vehicle is currently experiencing a problem that warrants immediate attention, then a live advisor 86 could suggest to the occupants that they seek a dealership, repair facility, etc. In other cases, the VDU may include a DTC that suggests a more developing, but not imminent, problem. In such a case, it may not be desirable to verbally or textually communicate with the occupants. In addition to providing verbal and/or textual feedback to the vehicle occupants, it is also possible for call center 20 to send data to vehicle 12. This data can include instructions to perform certain tasks (e.g., scripts, etc.), it can include a software patch or update, or any other information that may be suitable in light of the VDU. The data transmission could be with or without the knowledge of the vehicle occupants.

Step 114 determines if subsequent communications to the vehicle are needed—e.g., wireless vehicle-terminated calls. One way to perform this determination is to have live advisor 86 manually review the contents of the vehicle-originated call and make this determination, another way involves call center 20 automatically reviewing the contents of the vehicle-originated call and comparing them to some type of look-up table or other data structure to see if subsequent communications are needed. As an example, consider the situation where a diagnostic trouble code (DTC) is detected in step 102 indicating that the vehicle is experiencing a gradual loss of pressure in one or more of the engine cylinders. Assuming this DTC is considered serious, step 114 could determine that subsequent communications are needed in order to monitor cylinder pressure. This is a case where subsequent data communications between vehicle 12 and call center 20 are desired, so the method proceeds to step 116. In the event that no subsequent communications are needed, then the method can simply end.

In step 116, call center 20 provides the second vehicle component, which in the above cases is telematics unit 30, with a temporary number so that wireless vehicle-terminated calls can be made to vehicle 12. This temporary number is provided while the vehicle-originated call is still in progress. Step 116 can be performed in a number of ways, including the following exemplary one. First, a pool of available MDN/MIN numbers maintained at call center 20 is searched and one is selected. Second, the selected MDN/MIN is sent to vehicle 12 while the wireless vehicle-originated call is still underway so that telematics unit 30 can participate in normal two-way telephony. Next, the newly selected MDN/MIN and a corresponding electronic serial number (ESN) for telematics unit 30 are sent to wireless carrier 14 (the ESN information could be obtained during the vehicle-originated call). The wireless carrier uses this information to update a home location register (HLR) and telematics unit 30 becomes activated with the newly selected MDN/MIN so that vehicle-terminated calls to the telematics unit can be processed.

According to one specific embodiment, the MDN/MIN is only temporarily assigned to telematics unit 30; i.e., it is designed to expire at some point in the future. Step 120, which can be performed at call center 20, determines if the temporary number has expired and can use a number of different expiration conditions. Some examples of expiration conditions include the occurrence of an event that pertains to time, vehicle mileage, or communications between vehicle 12 and call center 20. To elaborate, the temporary number could expire after a certain period of time (e.g., one month after the temporary number is used to activate the telematics unit.); it could expire after a certain number of miles have been driven (e.g., one thousand miles following activation of the telematics unit); or it could expire following completion of certain communications between the vehicle and call center (e.g., after the completion of a series of wireless communications used to monitor a diagnostic condition at the vehicle), to name but a few. It should be pointed out again that telematics unit 30 is most likely inactive because the vehicle owner chose not to continue with their subscription to a telematics-based service. Thus, it may not be the objective of the telematics-based service provider to provide the telematics unit with a permanent MDN/MIN so that it can indefinitely engage in wireless communications; hence, the temporary number.

If the temporary number has not expired, then vehicle 12 and call center 20 can continue to engage in normal two-way wireless telephony, step 122. Once an expiration condition is met, the temporary number is removed from the second vehicle component and returned to the pool of available numbers, step 124. This typically results in the second vehicle component, which is telematics unit 30 in the exemplary embodiments above, being deactivated so that it can no longer receive wireless vehicle-terminated calls.

In another embodiment, instead of assigning a temporary number in step 116, the method could restrain the telephony options of the second vehicle component by restricting its communication to certain numbers or devices; such as numbers associated with call center 20. This way parties other than call center 20 would be unable to place vehicle-terminated calls to the otherwise active telematics unit. This precaution of restricted communications could be used in lieu of or in addition to the use of temporary numbers.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, it is possible to assign the second vehicle component with a temporary internet protocol (IP) address instead of a temporary MDN/MIN. In this example, subsequent vehicle-terminated calls would need to be made over a packet-data connection instead of a circuit-switch connection. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A system for communicating vehicle diagnostic data, comprising:

a first vehicle component that detects a vehicle diagnostic condition; and a second vehicle component that wirelessly communicates with a call center and is in communication with the first vehicle component, wherein, in response to the first vehicle component detecting the vehicle diagnostic condition:

i) the second vehicle component makes a first wireless call to the call center, wherein the first wireless call includes information representative of the vehicle diagnostic condition;

ii) the call center wirelessly sends a temporary number to the second vehicle component while the first wireless call is still in progress;

iii) the call center removes the temporary number after the temporary number has expired; and iv) the temporary number is a mobile dialing number/mobile identification number (MDN/MIN) that is paired with an electronic serial number (ESN) of the second vehicle component.

2. The system of claim 1, wherein the first vehicle component is a vehicle system module (VSM) that can generate a diagnostic trouble code (DTC) representative of the vehicle diagnostic condition, and the second vehicle component is a telematics unit that can wirelessly communicate with the call center.

3. The system of claim 1, wherein the second vehicle component determines if the vehicle diagnostic condition is a serious diagnostic condition before making the first wireless call to the call center.

4. The system of claim 1, wherein the second vehicle component retrieves a cleared number that is stored in memory at the vehicle, and uses the cleared number to make a wireless vehicle-originated call even though the second vehicle component is inactive.

5. The system of claim 4, wherein once a certain amount of time or vehicle mileage has expired, the second vehicle component cannot use the cleared number to make a wireless vehicle-originated call.

6. The system of claim 1, wherein the first wireless call to the call center is a vehicle data upload (VDU) that is sent from a telematics unit using a data connection over a voice channel.

7. The system of claim 1, wherein the temporary number expires after some event that pertains to time, vehicle mileage, or communications exchanged between the vehicle and the call center.

8. A method for communicating vehicle diagnostic data, comprising the steps of:

(a) detecting a vehicle diagnostic condition;

(b) evaluating the vehicle diagnostic condition at the vehicle to determine if it is a serious diagnostic condition;

(c) if the vehicle diagnostic condition is determined to be a serious diagnostic condition, then retrieving a cleared number that expires based on time or mileage and that is stored in memory at the vehicle and enables a telematics unit to make a wireless vehicle-originated call even though the telematics unit is inactive; and (d) making the wireless vehicle-originated call using the cleared number from the vehicle to the call center, wherein the wireless vehicle-originated call includes information representative of the serious diagnostic condition.

9. The method of claim 8, wherein step (a) further comprises detecting a vehicle diagnostic condition with a vehicle system module (VSM) and generating a diagnostic trouble code (DTC) that is representative of the vehicle diagnostic condition.

10. The method of claim 8, wherein step (a) further comprises detecting a vehicle diagnostic condition with a telematics unit.

11. The method of claim 8, wherein step (b) further comprises evaluating the vehicle diagnostic condition by utilizing a list of vehicle diagnostic conditions stored in memory at the vehicle.

12. The method of claim 8, wherein step (b) further comprises evaluating the vehicle diagnostic condition by determining a source of an electronic message that includes the vehicle diagnostic condition.

13. The method of claim 8, wherein once a certain amount of time or vehicle mileage has expired, the second vehicle component cannot use the cleared number to make a wireless vehicle-originated call.

14. The method of claim 8, wherein the wireless vehicle-originated call from the vehicle to the call center is a vehicle data upload (VDU) that is sent from the telematics unit using a data connection over a voice channel.

15. The method of claim 14, wherein the vehicle data upload (VDU) includes a vehicle identification number (VIN) and a diagnostic trouble code (DTC) that is representative of the serious diagnostic condition.

16. The method of claim 8, further comprising the step of:

(e) providing the telematics unit with a temporary number while the vehicle-originated call is still in progress, wherein the temporary number enables the telematics unit to receive wireless vehicle-terminated calls.

17. The method of claim 16, wherein step (e) further includes the steps of:

(i) selecting a mobile dialing number/mobile identification number (MDN/MIN) from a pool of available numbers;

(ii) providing the telematics unit with the selected MDN/MIN while the vehicle-originated call is still in progress; and (iii) providing the selected MDN/MIN and an electronic serial number (ESN) for the telematics unit to a wireless carrier, wherein the wireless carrier can use the MDN/MIN and ESN to update a home location register (HLR).

18. The method of claim 16, wherein the temporary number in step (e) expires after some event that pertains to time, vehicle mileage, or communications exchanged between the vehicle and the call center.

19. Method for communicating vehicle diagnostic data, comprising the steps of:

(a) detecting a vehicle diagnostic condition with a vehicle system module (VSM) and sending a diagnostic trouble code (DTC) from the VSM over a vehicle communications bus, wherein the DTC is representative of the vehicle diagnostic condition;

(b) receiving the diagnostic trouble code (DTC) at a telematics unit and comparing the DTC to a list of DTCs saved in memory in order to determine if the DTC is a serious DTC;

(c) if the diagnostic trouble code (DTC) is a serious DTC, then retrieving a cleared number that is stored in memory and enables the telematics unit to make a wireless vehicle-originated call even though the telematics unit is inactive;

(d) using the cleared number to make a wireless vehicle-originated call from the telematics unit to a call center, wherein the vehicle-originated call includes information that is representative of the diagnostic trouble code (DTC);

(e) activating the telematics unit with a temporary number that enables the telematics unit to receive wireless vehicle-terminated calls, wherein the activation at least partially occurs while the wireless vehicle-originated call is still in progress; and (f) deactivating the telematics unit after the temporary number expires.

* * * * *